United States Patent
Takahashi et al.

(10) Patent No.: US 12,055,108 B2
(45) Date of Patent: Aug. 6, 2024

(54) CONTROL METHOD AND CONTROL DEVICE FOR INTERNAL COMBUSTION ENGINE

(71) Applicant: Nissan Motor Co., Ltd., Yokohama (JP)

(72) Inventors: Katsuhito Takahashi, Kanagawa (JP); Hirofumi Tsuchida, Kanagawa (JP); Mitsuhiro Akagi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/553,218

(22) PCT Filed: Apr. 15, 2021

(86) PCT No.: PCT/JP2021/015532
§ 371 (c)(1),
(2) Date: Sep. 29, 2023

(87) PCT Pub. No.: WO2022/219766
PCT Pub. Date: Oct. 20, 2022

(65) Prior Publication Data
US 2024/0183322 A1    Jun. 6, 2024

(51) Int. Cl.
*F02D 35/02* (2006.01)
*F02D 41/00* (2006.01)
*F02P 5/152* (2006.01)

(52) U.S. Cl.
CPC ....... *F02D 35/027* (2013.01); *F02D 41/0007* (2013.01); *F02P 5/152* (2013.01)

(58) Field of Classification Search
CPC ..... F02D 41/0007; F02D 35/027; F02P 5/152
See application file for complete search history.

(56) References Cited

U.S. PATENT DOCUMENTS

| | | | | | |
|---|---|---|---|---|---|
| 4,323,045 | A | * | 4/1982 | Yamashita | F02M 26/57 123/568.12 |
| 2003/0196646 | A1 | * | 10/2003 | Shoyama | F02D 13/0273 123/568.21 |

FOREIGN PATENT DOCUMENTS

| | | |
|---|---|---|
| JP | S60-259759 A | 12/1985 |
| JP | S62-67265 A | 3/1987 |

(Continued)

OTHER PUBLICATIONS

Extended European Search Report of Apr. 19, 2024 of corresponding European Patent Application No. 21936256.3.

*Primary Examiner* — Kevin A Lathers
(74) *Attorney, Agent, or Firm* — Global IP Counselors, LLP

(57) ABSTRACT

A control method and a control device for controlling a spark-ignition internal combustion engine that is equipped with a turbocharger and an exhaust gas recirculation device. The operation of the engine is carried out to perform a stoichiometric air-fuel ratio by performing exhaust gas recirculation even in a high-load range including a maximum-output operation point. When the maximum output operation point is required, intake air information such as atmospheric pressure and outside air temperature is used as a basis to calculate intake air density, which is compared with a predetermined density threshold. When the intake density is equal to or less than the density threshold at a high-altitude location or the like, an exhaust gas recirculation rate is set to 0. As a result, the maximum output can be higher than when exhaust gas recirculation is performed.

6 Claims, 6 Drawing Sheets

(56) References Cited

FOREIGN PATENT DOCUMENTS

| JP | S62-225756 | A |   | 10/1987 |
|----|------------|----|---|---------|
| JP | 6-299894   | A |   | 10/1994 |
| JP | 3704726    | B2 | * | 10/2005 |
| JP | 2010-242630 | A |   | 10/2010 |
| JP | 5204025    | B2 |   | 6/2013  |

* cited by examiner

CONTROL METHOD AND CONTROL DEVICE FOR INTERNAL COMBUSTION ENGINE

CROSS-REFERENCE TO RELATED APPLICATIONS

This application is a U.S. national stage application of International Application No. PCT/JP2021/015532, filed on Apr. 15, 2021.

BACKGROUND

Technical Field

This invention relates to controlling exhaust gas recirculation in an internal combustion engine, and particularly to controlling exhaust gas recirculation in a high load range.

Background Information

Exhaust gas recirculation technology has been developed mainly to reduce the $NO_x$ content in a medium load range, but in recent years, as disclosed in Japanese Laid-Open Patent Application No. 2010-242630 A (Patent Citation 1), attempts have been made to recirculate exhaust gas mainly for the purpose of minimizing knocking and reducing exhaust gas temperature in a high load range.

However, problems have been presented in that when exhaust gas is recirculated in a high load range including a maximum output operation point, maximum output decreases significantly when intake air density decreases in concert with an increase in altitude.

SUMMARY

In controlling an internal combustion engine according to the present invention, information on density of intake air taken in as new air is acquired, and during high-load operation, an exhaust gas recirculation rate is changed so that the exhaust gas recirculation rate lessens when the density is low, on the basis of the intake air density information.

Any decrease in output is minimized by performing control so that the exhaust gas recirculation rate thus lessens when the intake air density is low.

BRIEF DESCRIPTION OF THE DRAWINGS

Referring now to the attached drawings which form a part of this original disclosure.

DETAILED DESCRIPTION OF EMBODIMENTS

An embodiment of the invention is described in detail below on the basis of the drawings.

Figure 1:
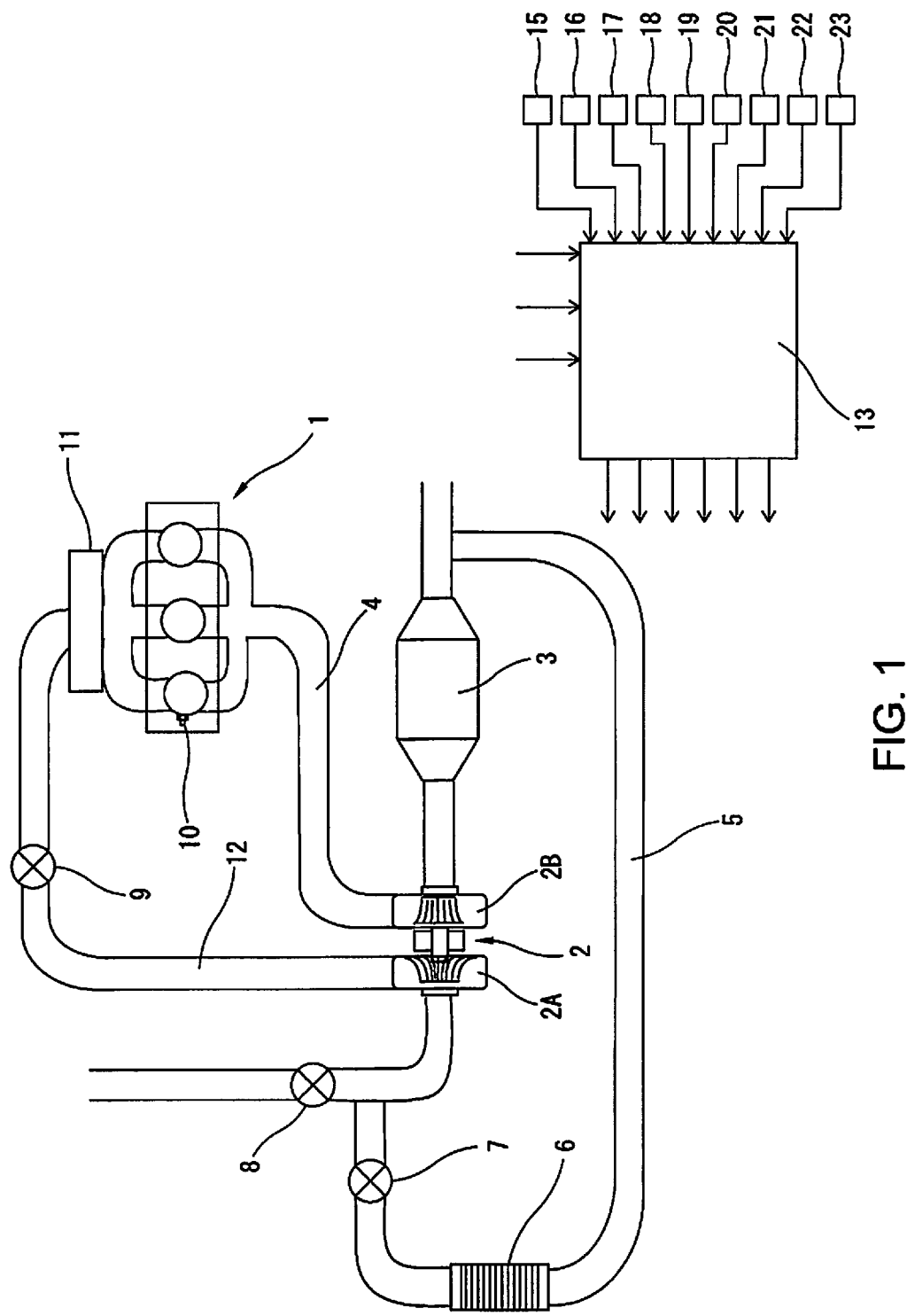
FIG. 1 is an explanatory configuration diagram of a system configuration of an internal combustion engine to which the invention is applied.

FIG. 1 shows a system configuration of an internal combustion engine 1 to which this invention is applied, the internal combustion engine 1 being used, e.g., in an automobile. The internal combustion engine 1 is, e.g., a four-stroke-cycle spark-ignition internal combustion engine equipped with a turbocharger 2. A catalyst device 3 including, for example, a three-way catalyst is provided in an exhaust gas passage 4 of the internal combustion engine 1, and a turbine 2B of the turbocharger 2 is located upstream of the catalyst device 3. The turbine 2B is equipped with a known electric waste gate valve (not shown) for supercharging pressure control.

An intake passage 12 of the internal combustion engine 1 has a throttle valve 9 partway therealong, and a compressor 2A of the turbocharger 2 is located on the upstream side of the throttle valve 9. A negative-pressure valve 8 for generating negative pressure is provided upstream of the compressor 2A. A water-cooling-type intercooler 11 is, for example, provided between the compressor 2A and the internal combustion engine 1 for cooling intake air that has reached a high temperature and high pressure. In the illustrated example, the intercooler 11 is located immediately upstream of an intake manifold.

The internal combustion engine 1 has, as an exhaust gas recirculation device, an exhaust gas recirculation passage 5 for recirculating some of the exhaust gas from the exhaust gas passage 4 to the intake passage 12. For example, one end of the exhaust gas recirculation passage 5 is connected to a downstream side of the catalyst device 3 of the exhaust gas passage 4, and the other end of the exhaust gas recirculation passage 5 is connected between the compressor 2A and the negative-pressure valve 8 of the intake passage 12. The exhaust gas recirculation passage 5 is provided with, for example, a water-cooling-type EGR gas cooler 6 for cooling recirculated exhaust gas and an EGR valve 7 for controlling an exhaust gas recirculation amount. A position of the EGR valve 7 is controlled by an engine controller 13 that performs control for the entire internal combustion engine 1.

A knocking sensor 10 for detecting vibration due to knocking is located in a body portion of the internal combustion engine 1. A known ignition timing retardation control is performed by the engine controller 13 using output of the knocking sensor 10.

The engine controller 13 receives, as inputs, detection signals from sensors other than the knocking sensor 10, such as an air flow meter 15 that detects an intake air amount, a crank angle sensor 16 that detects engine speed, an air-fuel ratio sensor 17 that detects an exhaust gas air-fuel ratio for air-fuel ratio feedback control, a water temperature sensor 18 that detects cooling water temperature, an accelerator position sensor 19 that detects a degree to which an acceleration pedal operated by a driver is depressed, a vehicle speed sensor 20 that directly or indirectly detects vehicle speed, an atmospheric pressure sensor 21 that detects atmospheric pressure (outside air pressure), an outside air temperature sensor 22 that detects outside air temperature, and a supercharging pressure sensor 23 that detects supercharging pressure. On the basis of these detection signals, the engine controller 13 optimally controls fuel injection amount, injection timing, ignition timing, position of the throttle valve 9, position of the EGR valve 7, supercharging pressure, etc.

In the configuration described above, exhaust gas is recirculated via the exhaust gas recirculation device even in a high load range including a maximum output operation point, and operation at a stoichiometric air-fuel ratio ($\lambda=1$) is achieved by minimizing knocking due to exhaust gas recirculation and minimizing the exhaust gas temperature. A basic exhaust gas recirculation rate is set in advance using the load and rotation speed of the internal combustion engine 1 as parameters, and the position of the EGR valve 7 is controlled so as to essentially conform to this basic exhaust gas recirculation rate.

Figure 3:
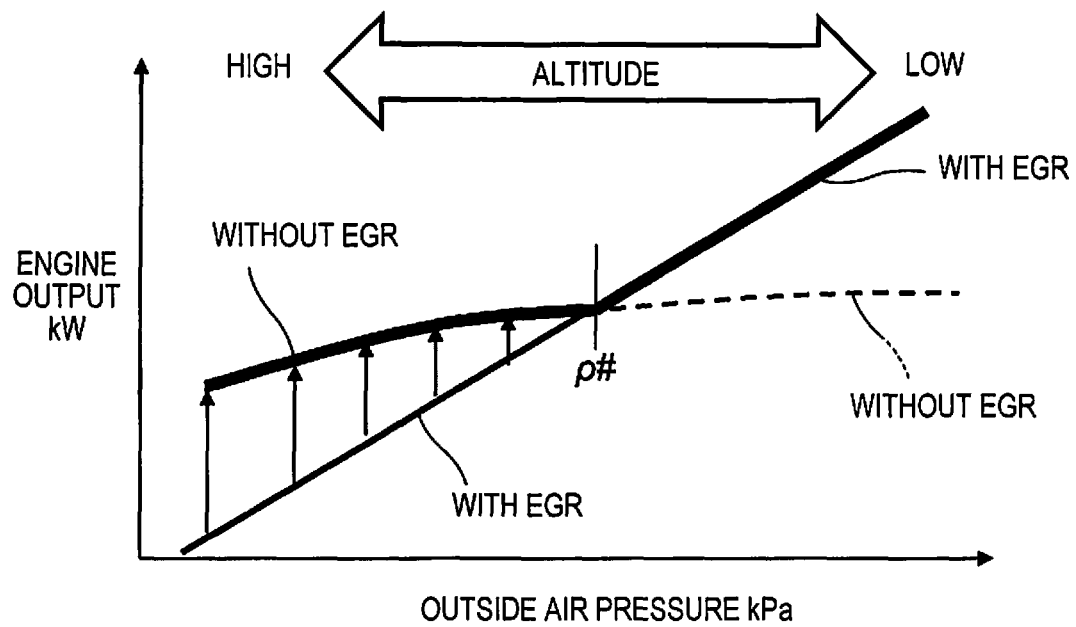
FIG. 3 is a characteristic diagram of a characteristic of changes in output relative to changes in outside air temperature in one embodiment.

When altitude is high and intake air taken in as new air decreases in density, maximum output of the internal combustion engine 1 decreases accordingly. FIG. 3 shows a decrease in maximum output with output (kW) of the internal combustion engine 1 on the vertical axis and outside air pressure (kPa) (equivalent to altitude) on the horizontal axis, but particularly when exhaust gas recirculation is involved, output decreases in proportion to the outside air pressure and the decrease in output at high altitudes will be greater than when exhaust gas recirculation is not performed. Below, the term "EGR" means exhaust gas recirculation. In FIG. 3, etc., "with EGR" is the characteristic when exhaust gas recirculation is involved, and "without EGR" is the characteristic when exhaust gas recirculation is not performed.

To minimize such decrease in maximum output at high altitudes, in this embodiment, a target exhaust gas recirculation rate is changed so that the exhaust gas recirculation rate lessens when intake air density is low.

Figure 2:
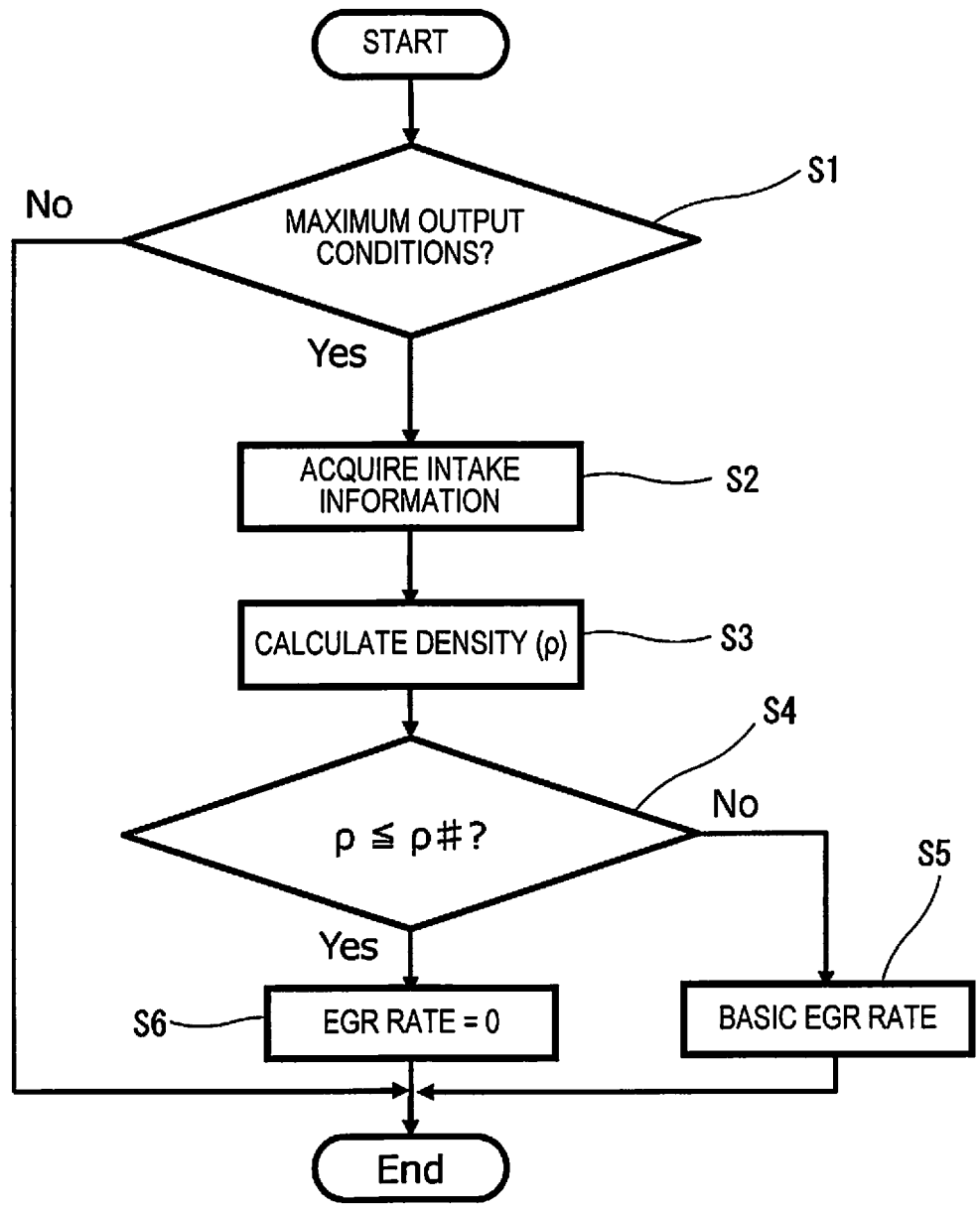
FIG. 2 is a flowchart of control of an exhaust gas recirculation rate during maximum-output operation.

FIG. 2 is a flowchart of a flow of a process for changing the exhaust gas recirculation rate at the maximum output operation point as executed by the engine controller 13. First, in step 1, a determination is made as to whether or not maximum output is required. It is assumed that maximum output is required when, for example, the degree to which the acceleration pedal is depressed detected by the accelerator position sensor 19 is equivalent to fully open. If the determination is NO in step 1, the routine is ended. In this case, as previously described, exhaust gas recirculation is executed in conformity with the basic exhaust gas recirculation rates corresponding to individual operating points.

If the determination is YES in step 1, the process advances to step 2 and intake information is acquired. For example, atmospheric pressure detected by the atmospheric pressure sensor 21 and outside air temperature detected by the outside air temperature sensor 22 are read as intake information. Altitude information obtained by a car navigation system instead of the atmospheric pressure sensor 21 may be used as the atmospheric pressure.

Next, in step 3, an intake air density $\rho$ is calculated from these items of intake information. In step 4, a determination is made as to whether or not the intake air density $\rho$ is equal to or less than a density threshold $\rho\#$. If the intake air density $\rho$ is greater than the density threshold $\rho\#$, the flow advances from step 4 to step 5, and exhaust gas recirculation is performed using the prevailing basic exhaust gas recirculation rate as the target exhaust gas recirculation rate. If the intake air density $\rho$ is equal to or less than the density threshold $\rho\#$, the flow advances from step 4 to step 6 and the exhaust gas recirculation rate is set to 0. A slight amount of exhaust gas recirculation may be performed without setting the value to 0 completely.

By performing such control, as shown in FIG. 3, exhaust gas recirculation will not be performed at altitudes higher than the point corresponding to the density threshold $\rho\#$, and a higher output than the characteristic for "with EGR" is obtained, as shown in the line for "without EGR".

Figure 4:
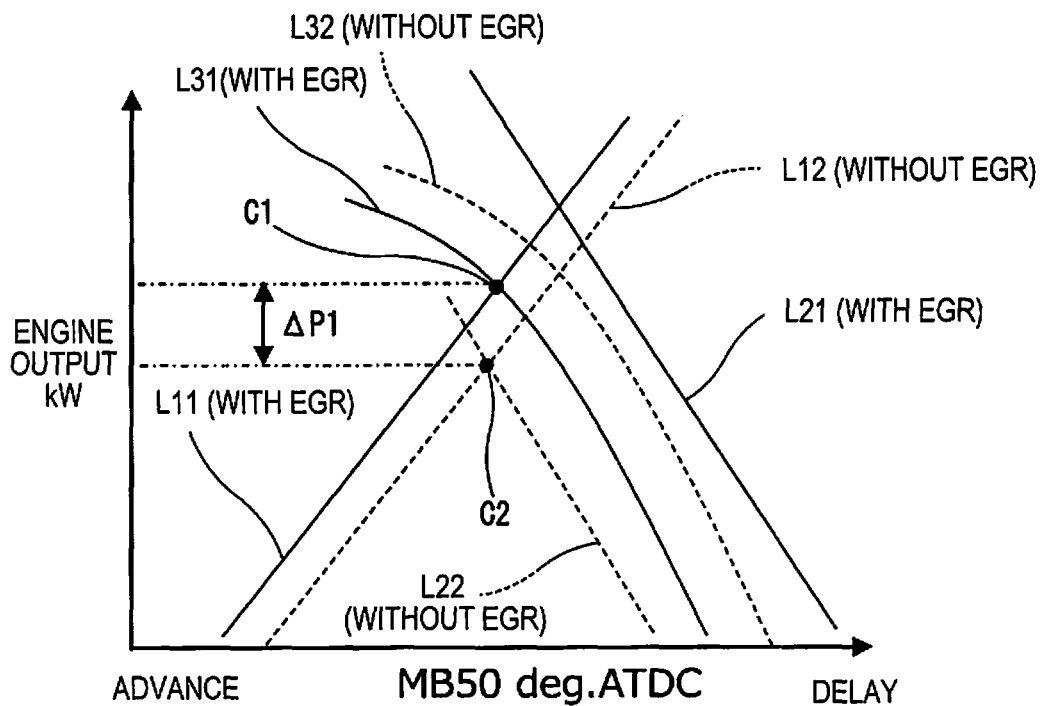
FIG. 4 is a characteristic diagram of output limit characteristics depending on whether or not exhaust gas is recirculated in a low-altitude location.
Figure 5:
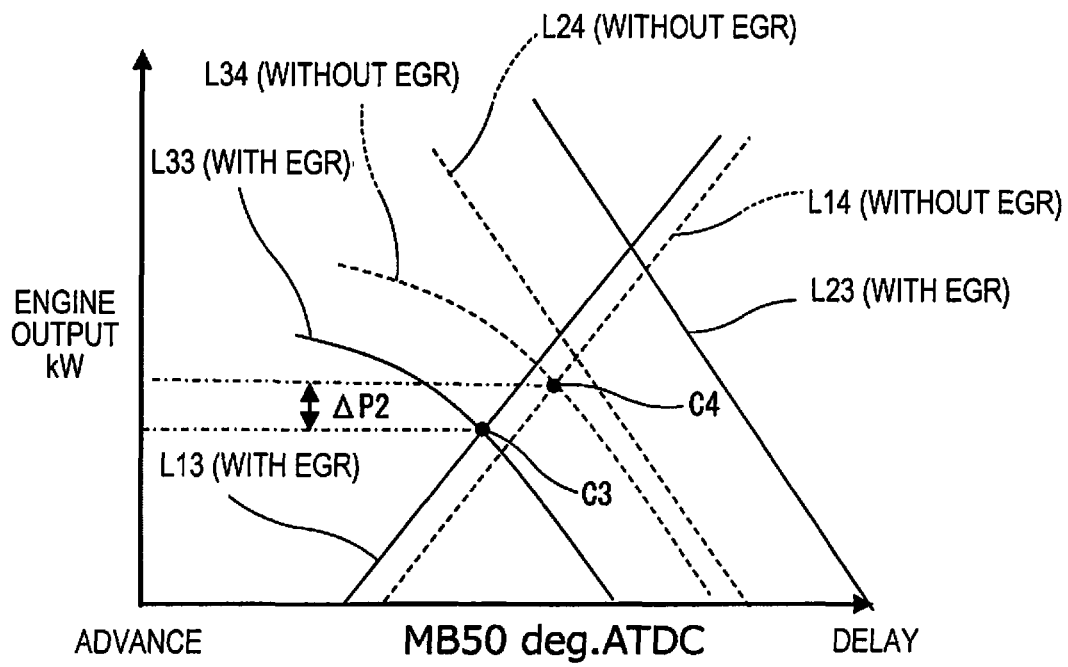
FIG. 5 is a characteristic diagram of output limit characteristics depending on whether or not exhaust gas is recirculated in a high-altitude location.

FIGS. 4 and 5 are explanatory depictions showing correlations of several output limits to explain that the above effects are obtained. The vertical axes in FIGS. 4 and 5 represent the output (KW) of the internal combustion engine 1, and the horizontal axes represent a combustion center of gravity, or MB50 (degrees ATDC). MB50 correlates to ignition timing, and in this embodiment is assumed to be a parameter that can be controlled as desired by changing the ignition timing. "Without EGR" indicates the characteristic for when the exhaust gas recirculation rate is 0, and "with EGR" indicates the characteristic below the basic exhaust gas recirculation rate.

FIG. 4 shows an example of when maximum output is requested at an altitude of 0 m. Output at a high-speed, high-load range of the internal combustion engine 1, which is a spark-ignition internal combustion engine, is, first, limited by knocking limits shown by line L11 (with EGR) and line L12 (without EGR). In the area to the left and above the knocking limits L11, L12 in FIG. 4, operation cannot be established due to knocking, and operation is possible only in the area to the right and below the knocking limits L11, L12. Knocking is more likely to occur at earlier ignition timings, and the output is therefore limited. Accordingly, the knocking limits L11, L12 have sloped characteristic lines as shown. Since knocking is minimized by EGR, line L11 indicating the knocking limit with EGR is positioned above (that is, on the higher output side of) line L12 indicating the knocking limit without EGR.

Similarly, since the exhaust gas temperature rises in a high-speed, high-load range, the output of the internal combustion engine 1 is limited by exhaust gas temperature limits indicated by line L21 (with EGR) and line L22 (without EGR), from the standpoint of, inter alia, protecting exhaust system components. Since the exhaust gas temperature increases as MG50 progresses toward the delay side, the exhaust gas temperature limits L21, L22 are characteristic lines sloping downward to the right as shown in FIG. 4, and operation is possible only in the area below and to the left of the exhaust gas temperature limits L21, L22. Since the exhaust gas temperature decreases due to EGR, line L21 indicating the exhaust gas temperature limit with EGR is positioned above (that is, on the higher output side of) line L22 indicating the exhaust gas temperature limit without EGR.

The output of the internal combustion engine 1 is further limited by an air amount limit due to the turbocharger 2. The air amount limit results in a right-downward sloping curve as shown in FIG. 4 as line L31 (with EGR) and line L32 (without EGR). This is a restriction due to the rotational speed limit of the turbocharger 2. The amount of gas pushed into the cylinder by the turbocharger 2 is constant, and the amount of air (amount of oxygen) lessens as the amount of exhaust gas recirculation increases. Therefore, the air amount limit L31 with EGR is on the lower side of (that is, on the low-output side of) the air amount limit L32 without EGR.

Therefore, from the viewpoint of the knocking limit and the exhaust gas temperature limit, operation is established only in the area defined by characteristic lines L11, L12 and characteristic lines L21, 22, and the maximum output of the internal combustion engine 1 can be obtained as restricted by the air amount limits L31, L32. At an altitude of 0 m in FIG. 4, without EGR, maximum output is reached at an intersection point C2 between the knocking limit L12 and the exhaust gas temperature limit L22 without the restriction of the air amount limit L32, and with EGR, maximum output is reached at an intersection point C1 between the knocking limit L11 and the air amount limit L31 due to the restriction of the air amount limit L31.

As is clear from the height positions of intersection points C1 and C2, output is higher at intersection point C1 with EGR. That is, basically, knocking is further minimized and the exhaust gas temperature is further lowered with a greater amount of exhaust gas recirculation, and the maximum output can therefore be further increased. For example, the output at ΔP1 can be improved by exhaust gas recirculation.

FIG. 5 shows the characteristics at high altitude, and similar to what was previously described, maximum output is restricted by the knocking limit indicated by line L13 (with EGR) and line L14 (without EGR), the exhaust gas temperature limit indicated by line L23 (with EGR) and line L24 (without EGR), and the air amount limit indicated by line L33 (with EGR) and line L34 (without EGR). When the intake air density ρ is low in accordance with the high altitude, the basis maximum output points obtained as intersection points between the knocking limit and the exhaust gas temperature limit are each slightly lower than at an altitude of 0 m, but the air amount limits L33 and L34 also decrease, and in particular, the air amount limit L33 with EGR greatly decreases. Therefore, without EGR, maximum output is reached at intersection point C4 between the knocking limit L14 and the air amount limit L34 due to the restriction of the air amount limit L34, and with EGR, maximum output is reached at an intersection point C3 between the knocking limit L13 and the air amount limit L33 due to the restriction of the significantly decreased air amount limit L33.

As is clear from the height positions of intersection points C3 and C4, at high altitude, output is higher at intersection point C4 without EGR. That is, the magnitude relationship of the maximum output depending on whether or not exhaust gas is recirculated is the opposite of that at an altitude of 0 m. Therefore, the output at ΔP2 can be improved by stopping exhaust gas recirculation.

Figure 6:
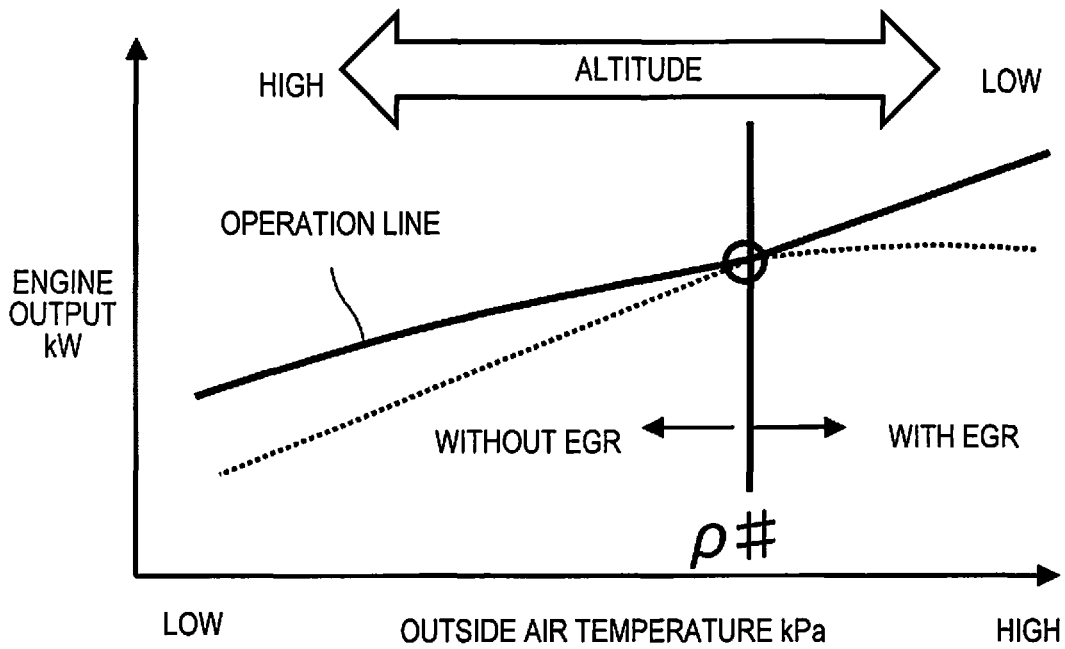
FIG. 6 is a characteristic diagram of output characteristics depending on a high density threshold setting when the outside air temperature is low.
Figure 7:
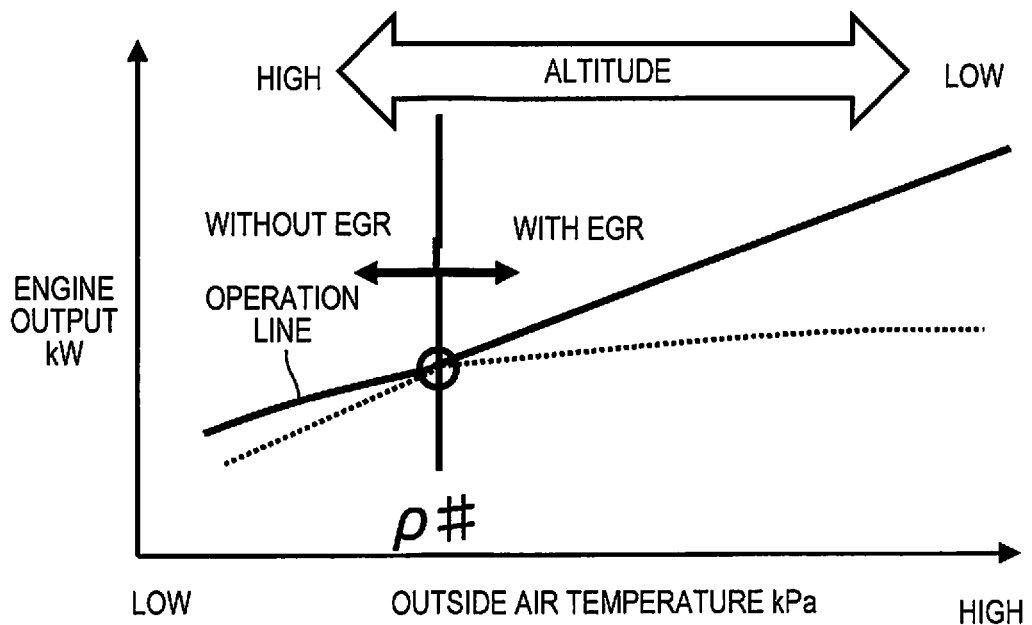
FIG. 7 is a characteristic diagram of output characteristics depending on a high density threshold setting when the outside air temperature is high.

The likelihood of knocking, which determines the knocking limit, is also affected by the outside air temperature. Therefore, in a preferred embodiment, the density threshold ρ# mentioned above is set according to the outside air temperature. Specifically, the density threshold ρ# is set to a lower value as the outside air temperature increases. FIGS. 6 and 7 are characteristic diagrams with output and outside air pressure as parameters, similar to FIG. 3. FIG. 6 shows the characteristics when the outside temperature is low, and FIG. 7 shows the characteristics when the outside temperature is high. For each characteristic, the exhaust gas recirculation rate is 0 in the area below the outside air pressure equivalent to the density threshold ρ#. As shown in the diagrams, the density threshold ρ# is set relatively high in FIG. 6, and the density threshold ρ# is set relatively low in FIG. 7. By setting the density threshold ρ# to the low density side when the outside air temperature is high, where knocking is likely to occur, exhaust gas recirculation will be performed even at relatively high altitudes, knocking minimization due to exhaust gas recirculation, and, by extension, ignition timing advancing and exhaust gas temperature minimization will be achieved, and maximum output can be ensured at the same time.

In addition to the outside air temperature, other indicators that can be used to indicate the likelihood of knocking include fuel octane rating, intake air temperature, and cooling water temperature. The density threshold ρ# may be set in the same manner as described above on the basis of one or more of these indicators including the outside air temperature.

Figure 8:
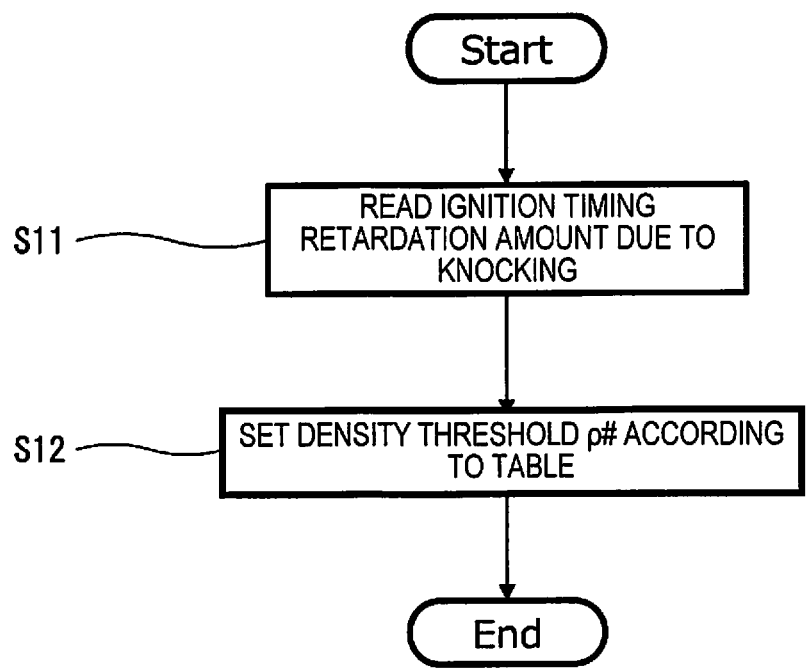
FIG. 8 is a flowchart for setting the density threshold.
Figure 9:
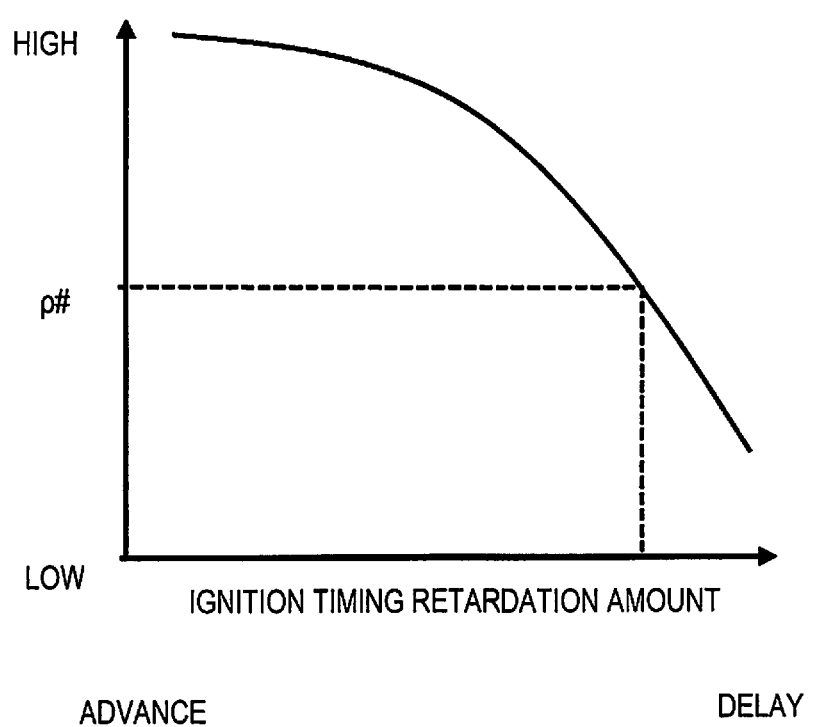
FIG. 9 is a characteristic diagram of a relationship between ignition timing retardation amount and density threshold.

In addition, an ignition timing retardation amount in ignition timing retardation control based on the output of the knocking sensor 10 can be used as an indicator of the actual degree or likelihood of knocking regardless of the outside air temperature. FIGS. 8 and 9 show an embodiment in which the density threshold ρ# is thus set on the basis of the ignition timing retardation amount. The flowchart of FIG. 8 shows a process for setting the density threshold ρ#, where the ignition timing retardation amount due to knocking is read in step 11, and the density threshold ρ# is set using a prescribed table in step 12. FIG. 9 shows an example of the characteristics of the table used in step 12, and the density threshold ρ# is set lower as the ignition timing retardation amount increases.

An embodiment of the invention was described above, but the invention is not limited to the above embodiment; various changes can be made. For example, the above embodiment is a "low-pressure EGR system" in which recirculated exhaust gas flows into the intake system on the upstream side of the compressor 2A of the turbocharger 2, but the present invention can be similarly applied to a "high-pressure EGR system" in which recirculated exhaust gas flows into the intake system on the downstream side of the compressor 2A.

Furthermore, the present invention can also be applied to a naturally aspirated engine that does not have a supercharger. Even in a naturally aspirated engine, the air amount limit moves to the low output side as the intake air density ρ decreases.

The invention claimed is:

1. A control method for a spark-ignition internal combustion engine equipped with a turbocharger in which exhaust gas recirculation is performed during high-load operation, the control method comprising:
   acquiring information on a density of an intake air taken in as new air;
   during high-load operation, stopping exhaust gas recirculation when the density is lower than a density threshold based on the information on the density of the intake air;
   acquiring an indicator of a degree of ongoing knocking or a likelihood of knocking; and
   setting the density threshold to a lower density based on the indicator in response to a condition in which knocking is more likely.

2. The control method according to claim 1, wherein the indicator includes at least one of the following: a fuel octane rating, an outside air temperature, an intake air temperature, and a cooling water temperature.

3. The control method according to claim 1, wherein the indicator is a retardation amount in knocking control in which ignition timing retardation is performed based on a detection signal from a knocking sensor.

4. The control method according to claim 1, wherein a time during high-load operation in which the stopping of exhaust gas recirculation based on the intake air density is performed corresponds to a time during maximum output operation in which the turbocharger reaches a rotational speed limit.

5. The control method according to claim 1, wherein during maximum output operation under a standard intake air density, combustion is performed at a stoichiometric air-fuel ratio while exhaust gas recirculation is performed.

6. A control device for an internal combustion engine equipped with an exhaust gas recirculation device, the control device comprising:

exhaust gas recirculation is performed by the exhaust gas recirculation device in an operation area including a high-load range, information on density of intake air taken in as new air is acquired, and during high-load operation, an exhaust gas recirculation rate is stopped the density is lower than a density threshold based on the information of the density of the intake air, and, an indicator of a degree of ongoing knocking or a likelihood of knocking is acquired, and the density threshold is set to a lower density based on the indicator in response to a condition in which knocking is more likely.

* * * * *